United States Patent [19]

Reuter et al.

[11] Patent Number: 5,534,601
[45] Date of Patent: Jul. 9, 1996

[54] POLYISOCYANATE-MODIFIED DICARBOXYLIC (POLY) ANHYDRIDES

[75] Inventors: Knud Reuter, Krefeld; Walter Schäfer, Leichlingen; Hanns P. Müller, Odenthal; Hans-Ulrich Meier-Westhues, Leverkusen; Lothar Kahl, Bergisch Gladbach; Manfred Bock, Leverkusen, all of Germany

[73] Assignee: Bayer Aktiengesellschaft, Leverkusen, Germany

[21] Appl. No.: 504,159

[22] Filed: Jul. 19, 1995

[30] Foreign Application Priority Data

Aug. 1, 1994 [DE] Germany .................. 44 27 225.1

[51] Int. Cl.$^6$ ..................................... C08G 18/34
[52] U.S. Cl. ..................... 525/424; 525/440; 528/68; 528/84
[58] Field of Search .................. 525/418, 424, 525/440; 528/68, 84

[56] References Cited

U.S. PATENT DOCUMENTS

| | | | |
|---|---|---|---|
| 4,124,568 | 11/1978 | Zecher et al. | 528/59 |
| 5,055,524 | 10/1991 | Pettit, Jr. et al. | 525/172 |
| 5,270,391 | 12/1993 | Miyazaki et al. | 525/194 |
| 5,371,167 | 12/1994 | Rehfuss et al. | 528/73 |

FOREIGN PATENT DOCUMENTS

| | | |
|---|---|---|
| 2064292 | 10/1992 | Canada . |
| 57-28128 | 2/1982 | Japan . |
| 7-196798 | 8/1995 | Japan . |
| 1415013 | 11/1975 | United Kingdom . |
| 1429758 | 3/1976 | United Kingdom . |

OTHER PUBLICATIONS

Derwent accession No. 73-3180U/22 for Japanese Patent No. 73-17477, Furukawa Electric Co. Ltd., 1973.

*Primary Examiner*—Robert E. Sellers
*Attorney, Agent, or Firm*—Joseph C. Gil; Thomas W. Roy

[57] ABSTRACT

Polyisocyanate-modified dicarboxylic (poly)anhydrides which are solid below 40° C., liquid above 120° C. and based on the reaction product of organic polyisocyanates with more than equivalent quantities, based on the NCO/COOH reaction, of dicarboxylic (poly)anhydrides containing free carboxyl groups and optional subsequent modification of the reaction product with less than equivalent quantities, based on the anhydride groups, of anhydride-reactive amino and/or hydroxyl groups; and powder coating compositions containing as binder these polyisocyanate-modified dicarboxylic (poly)anhydrides as curing agents for polyepoxides.

4 Claims, No Drawings

POLYISOCYANATE-MODIFIED DICARBOXYLIC (POLY) ANHYDRIDES

BACKGROUND OF THE INVENTION

1. Field of the Invention

This invention relates to polyisocyanate-modified dicarboxylic (poly)anhydrides, to a process for their production by reaction of carboxy-functional dicarboxylic (poly)anhydrides with organic polyisocyanates and to their use as curing agents for powder coating compositions based on polyepoxides.

2. Description of the Prior Art

Polyanhydrides of aliphatic dicarboxylic acids and their production from aliphatic dicarboxylic acids by reaction with acetic anhydride are known (Houben-Weyl, Methoden der organischen Chemie, 4. Ausgabe/Erweiterungs-und Folgebände, Band E 20, Part 2, pages 1400 to 1402). It is also known that corresponding polyanhydrides can be used as curing agents for powder-form epoxy resins (DE-OS 2,261,335 or BE-PS 819,623).

A polyol modification of these polyanhydrides which is particularly suitable for powder coatings is described, for example, in EP-A- 0,299,420. A disadvantage of the paint systems specifically described in the examples lies in the comparatively high stoving temperatures of 163° to 177° C.

Although the systems according to EP-A-0,509,393, which also contain dicarboxylic polyanhydrides inter alia as curing agents, have comparatively lower stoving temperatures, they are dependent on the use of selected epoxy-functional copolymers having a high styrene content. The systems according to EP-A-0,544,206, which contain free dicarboxylic acids as curing agents, also have comparatively low stoving temperatures. Unfortunately, these systems are attended by the disadvantage of comparatively poor levelling properties, as shown in Comparison Example 7 of the examples.

It has now surprisingly been found that, by modifying carboxy-functional dicarboxylic (poly)anhydrides with polyisocyanates and optionally with compounds containing anhydride-reactive amino and/or hydroxyl groups, it is possible to obtain curing agents which, together with typical epoxy-functional paint resins, provide for the production of high-quality coating compositions. A particular advantage in this regard is that both the crosslink density and also the elasticity of the paints are increased with these curing agents. It is an additional advantage by using these compositions the stoving temperature can be reduced to 130°–140° C.

SUMMARY OF THE INVENTION

The present invention relates to polyisocyanate-modified dicarboxylic (poly)anhydrides which are solid below 40° C., liquid above 120° C. and based on the reaction product of organic polyisocyanates with more than equivalent quantities, based on the NCO/COOH reaction, of dicarboxylic (poly)anhydrides containing free carboxyl groups and optional subsequent modification of the reaction product with less than equivalent quantities, based on the anhydride groups, of anhydride-reactive amino and/or hydroxyl groups.

The present invention also relates to powder coating compositions containing as binder these polyisocyanate-modified dicarboxylic (poly)anhydrides as curing agents for polyepoxides.

DETAILED DESCRIPTION OF THE INVENTION

More particularly, the present invention relates to polyisocyanate-modified dicarboxylic (poly)anhydrides which have a carboxyl group content of 0.5 to 30% by weight, an anhydride group content (expressed as $C_2O_3$) of 5 to 35% by weight and a nitrogen content of 0.2 to 8% by weight and are reaction products prepared with elimination of carbon dioxide at an NCO:COOH equivalent ratio of 0.01:1 to 0.6:1 of A) an anhydride component containing one or more dicarboxylic (poly)anhydrides corresponding to formula (II):

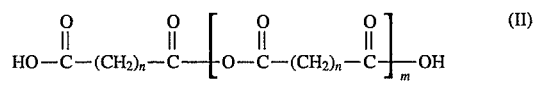

optionally present in admixture with up to 50% by weight, based on the total weight of component A), of dicarboxylic acids corresponding to formula (I):

with

B) a polyisocyanate component containing one or more organic polyisocyanates and optionally C) less than equivalent quantities, based on the anhydride groups, of compounds containing anhydride-reactive amino and/or hydroxyl groups, wherein m is an integer of 1 to 100 and n is an integer of 4 to 16.

Examples of suitable dicarboxylic acids corresponding to formula (I) include adipic acid, azelaic acid, sebacic acid or 1,12-dodecanedioic acid. Adipic acid and 1,12-dodecanedioic acid are especially preferred.

The anhydrides of formula (II) are prepared from the acids of formula (I) and are prepared in known manner by reacting the corresponding dicarboxylic acid with acetic anhydride at 120° to 150° C. with subsequent removal of volatile constituents from the reaction mixture by distillation. In this reaction, the starting materials are used in quantities corresponding to a molar ratio of acetic anhydride to dicarboxylic acid of at least 0.25:1, preferably at least 0.5:1 and more preferably 0.5:1 to 0.9:1.

Polyisocyanate component B) may be selected from any organic compounds which contain at least two isocyanate groups per molecule but which are otherwise inert under the reaction conditions of the process according to the invention. Suitable polyisocyanates include aromatic polyisocyanates such as 2,4- and/or 2,6-diisocyanatotoluene, 4,4'-diisocyanatodiphenyl methane and mixtures thereof with its isomers and higher homologs, reaction products of 2,4- and/or 2,6-diisocyanatotoluene with low molecular weight polyols such as trimethylol propane, uretdione diisocyanates based on 2,4- and/or 2,6-diisocyanatotoluene, isocyanurate polyisocyanates based on these diisocyanates and mixtures of these aromatic polyisocyanates.

Polyisocyanate component B) is preferably selected from organic polyisocyanates containing (cyclo)aliphatically bound isocyanate groups having a molecular weight of 168 to 1,000 such as hexamethylene diisocyanate (HDI), isophorone diisocyanate (IPDI), 4,4'-diisocyanatodicyclohexyl methane, and the known biuret-, isocyanurate-, uretdione-, urethane- and/or allophanate-modified derivatives of these diisocyanates. Mixed trimers prepared from mixtures of aliphatic and aromatic diisocyanates, preferably HDI and 2,4- and/or 2,6-diisocyanatotoluene, may also be used as component B) according to the invention. Mixtures of the preceding polyisocyanates may also be used as component B).

Optional component C) is selected from organic compounds having a molecular weight of 60 to 500, preferably 92 to 350, which contains a total of at least one and preferably at least two anhydride-reactive amino and/or hydroxyl groups per molecule. Examples of such organic compounds include diamines such as ethylene diamine, 1,2-diaminopropane, 1,3-diaminopropane, 1,4-diaminobutane, 1,5-diaminopentane, 1,6-diaminohexane, N,N'-dimethyl ethylene diamine, diethylene triamine, triethylene tetramine, tetraethylene pentamine, pentaethylene hexamine, N-methyl-1,3-diaminopropane, 2,5-diamino-2,5-dimethyl hexane, trimethyl-1,6-hexane diamine and isophorone diamine; amino-alcohols such as ethanolamine, diethanolamine, propanolamine, dipropanolamine, N-methyl ethanolamine, 1-amino-2-propanol, diisopropanolamine, 2-amino-2-methyl propanol, 2-amino-2-methyl propane-1,3-diol and 2-amino-2-hydroxymethyl propane-1,3-diol; and alcohols such as ethylene glycol, propane-1,2-diol, propane-1,3-diol, butane-1,4-diol, butane-1,3-diol, butane-1,2-diol, butane-2,3-diol, pentane- 1,5-diol, adipol (hexane-1,6-diol), neopentyl glycol, glycerol, trimethylol propane, trim ethylol ethane and pentaerythritol.

In the production of the polyisocyanate-modified dicarboxylic (poly)anhydrides, there is no need to use dicarboxylic (poly)anhydrides of formula (II) prepared in advance because the reaction of organic dicarboxylic acids with polyisocyanates at a temperature of 100° to 180° C., preferably 120° to 150° C., takes place not only with amide formation, but also with formation of anhydride groups. This is especially true when (cyclo)aliphatic polyisocyanates B) are used, i.e., the reaction always gives reaction products with an anhydride group content within the limits mentioned above.

Even though it is possible to prepare the polyisocyanate-modified dicarboxylic (poly)anhydrides in one step, starting component A) is preferably a dicarboxylic (poly)anhydride corresponding to formula (II) or a mixture of such anhydrides with the corresponding dicarboxylic acids of formula (I).

In the production of the polyisocyanate-modified dicarboxylic (poly)anhydrides to be used in accordance with the invention, component B) is used in quantities of 1 to 55% by weight, preferably 2 to 25% by weight, based on the total weight of components A) and B), provided that the NCO-:COOH equivalent ratio is 0.01:1 to 0.6:1, preferably 0.02:1 to 0.4:1. Optional component C) is used in quantities of up to 20% by weight, based on the total weight of components A) and B), provided that the molar ratio of amino groups and hydroxyl groups to anhydride groups is at most 0.9:1, preferably 0:1 to 0.3:1.

The reaction between components A) and B) generally takes place in the melt at 100° to 180° C., preferably 120° to 150° C., until the elimination of carbon dioxide is complete. However, preparation of the anhydride component by reaction of the corresponding dicarboxylic acids with acetic anhydride and the reaction of the anhydride component A) with the polyisocyanate component B) may also be carried out in a one-pot reaction by reacting the dicarboxylic acid with acetic anhydride and polyisocyanate B) at the temperatures mentioned and subsequently distilling off volatile constituents from the reaction mixture. This procedure generally results in reaction products which have a lower molecular weight than reaction products prepared in two stages from corresponding materials.

When additional modifying components C) are used, it is advantageous to complete the modification reaction between anhydride component A) and polyisocyanate component B) as evidenced by completion of the evolution of carbon dioxide before adding component C). This second modification reaction is advantageously carried out under the same reaction conditions as the first modification reaction, i.e., at a temperature of 100° to 180° C., preferably 120° to 150° C. It is also possible initially to react the anhydride component A) with component C) and then to carry out the isocyanate modification. Finally, it is also possible to react component A) simultaneously with components B) and C), for example, when using propylene glycol as component C). In this case reaction products containing both ester groups (from anhydride and hydroxyl groups) and urethane groups (from isocyanate groups and hydroxyl groups) are obtained, which are also suitable as curing agents for epoxy resins.

It is possible, but not preferred, to use other modification products, such as monoisocyanates, which may be used in quantities of 0 to 10% by weight, based on the total weight of components A) and B). In such a case, the monoisocyanates are generally used in admixture with component B). Suitable monoisocyanates include butyl isocyanate, stearyl isocyanate, cyclohexyl isocyanate and mixtures thereof.

The particularly preferred compounds according to the invention are reaction products of 75 to 98 parts by weight of component A) with 2 to 25 parts by weight of component B) and 0 to 10 parts by weight of component C). The number average molecular weight of the compounds according to the invention is 500 to 50,000, preferably 500 to 10,000 and more preferably 1,000 to 5,000. The number average molecular weight may be determined, for example, by gel permeation chromatography using polystyrene as standard. The compounds to be used in accordance with the invention generally contain 0.5 to 30% by weight, preferably 1.5 to 15% by weight of carboxyl groups, 5 to 35% by weight of anhydride groups (expressed as $(C_2O_3)$), and 0.2 to 8% by weight of nitrogen essentially in the form of amide and/or urea groups.

The compounds according to the invention are solid below 40° C. and liquid above 120° C. and are particularly suitable for use as curing agents in powder coating compositions containing epoxy resins. The powder coatings contain these resin components as the binder and may optionally contain other known powder coating composition additives such as flow control agents, deaerating agents, catalysts, pigments, flatting agents or UV stabilizers.

The powder coating compositions generally contain 10 to 50% by weight of curing agents according to the invention and of 50 to 90% by weight of epoxy-functional resins, wherein the sum of these percentages is 100, in addition to the previously disclosed optional additives.

Preferred epoxy-functional resins are epoxy-functional acrylic polymers, although polyglycidyl ethers of OH-functional polycondensates may also be used. The epoxy-functional acrylic polymers may be copolymers of ethylenically unsaturated esters or ethers containing epoxy groups (such as glycidyl acrylate, glycidyl methacrylate or allyl glycidyl ethers) with other esters of acrylic and methacrylic acid with monohydric $C_{1-18}$ alcohols and other comonomers. The esters include methyl (meth)acrylate, ethyl (meth)acrylate, butyl (meth)acrylate, isobutyl (meth)acrylate, hexyl (meth) acrylate, 2-ethylhexyl (meth)acrylate and stearyl (meth) acrylate.

Other comonomers without epoxy groups include styrene, α-methyl styrene, vinyl toluene, (meth)acryionitrile, vinyl(idene) halides (such as vinyl chloride and vinylidene chloride) and vinyl esters (such as vinyl acetate and vinyl versatate).

The acrylic polymer is preferably prepared from a monomer mixture containing 5 to 60% by weight, more preferably 20 to 50% by weight, of the epoxy-functional monomers. The epoxy equivalent weight of the epoxy-functional copolymers is generally 250 to 1,000. The production of such copolymers is known and described, for example, in EP-A-0,299,420. Examples of suitable epoxy-functional polymers are the products marketed by Mitsui Toatsu under the tradenames Almatex PD 7610 and Almatex AP 3402.

The curing agents according to the invention may also be used in combination with epoxy-functional polycondensation resins. Examples of such resins are the known reaction products of epichlorohydrin with polyhydric phenols, preferably bisphenol A, or with phenol-based Novolak resins.

The production of the powder coatings may be carried out, for example, by homogenization of the components in an extruder, melting and grinding of the solidified melt. The powder coatings are applied by known methods, for example, by electrostatic spraying.

The powder coating compositions according to the invention generally have a softening range of 80° to 120° C. The coating compositions are cured at stoving temperatures of about 120° to 180° C., preferably 130° to 160° C. for stoving times of 10 to 40 minutes, preferably 15 to 30 minutes. The stoving time depends upon the stoving temperature.

The powder coating compositions according to the invention are preferably used for the production of clear coatings and, more preferably, as clear top coats to be applied to base coats containing metallic pigments on automobiles.

In the following examples, all parts and percentages are by weight, unless otherwise indicated. All reactions were carried out under nitrogen as inert gas.

COMPARISON EXAMPLE 1

(according to EP 299,420)

1,037 parts of dodecandioic acid and 306 parts of acetic anhydride were heated for 2 hours at 125° C. All of the volatile constituents were then distilled off in a water jet vacuum at 125° C. 50 parts of trimethylol propane were then added under nitrogen and the reaction mixture was reacted for 1 hour at 135° C. Any residual volatile constituents present were removed in a high vacuum. The resulting melt solidified on cooling under nitrogen. Mp.: 114°–115° C.

EXAMPLE 1

(epoxy-based paint resin)

307 parts of xylene were introduced under nitrogen and heated to the reflux temperature. A mixture of 176 parts of glycidyl methacrylate, 176 parts of methyl methacrylate, 44 parts of butyl acrylate, 44 parts of styrene and 21.9 parts of azo-bis-isobutyronitrile was added dropwise over a period of 3 h.

The mixture was then heated for 2 h to the reflux temperature. At the end of this time, xylene was removed by vacuum distillation. The resulting epoxy-functional polymer had a solids content of 99% by weight and melted at 90° to 100° C.

EXAMPLE 2

182 parts of sebacic acid and 61 parts of acetic anhydride were heated for 2 h at 125° C. All of the volatile constituents were then distilled off in a water jet vacuum at 125° C. 70 parts of a 70% solution in methoxypropyl acetate/xylene (1:1) of an isocyanurate-modified IPDI trimer having an NCO content of the solution of 11.5% (Desmodur Z 4370, available from Bayer) were added dropwise to the resulting polyanhydride melt over a period of 2 hours at 125° C. with elimination of $CO_2$. After 1 h at 135° C., no more free NCO was detected (IR spectrum). The solvent was distilled off in a water jet vacuum.

The residue (modified polysebacic anhydride) melted at 75° to 78° C. and contained 12.8% of carboxyl groups, 18.0% of anhydride groups ($C_2O_3$) and 2.5% of nitrogen.

EXAMPLE 3

182 parts of sebacic acid, 61 parts of acetic anhydride and 16.2 parts of isophorone diisocyanate were reacted as in Example 2. The resulting solid crosslinking agent melted at 86° to 105° C. and contained 15.8% of carboxyl groups, 21.9% of anhydride groups and 1.1% of nitrogen.

EXAMPLE 4

829 parts of dodecanedioic acid, 245 parts of acetic anhydride and 65 parts of isophorone diisocyanate were reacted as in Example 2. The crosslinking agent melted at 82° to 89° C. and contained 9.8% of carboxyl groups, 20.0% of anhydride groups and 1.0% of nitrogen.

EXAMPLE 5

829 parts of dodecanedioic acid, 245 parts of acetic anhydride and 278 parts of the IPDI trimer described in Example 2 were reacted as in Example 2. The resulting crosslinking agent melted at 76° to 81° C. and contained 7.8% of carboxyl groups, 18.3% of anhydride groups and 2.3% of nitrogen.

EXAMPLE 6

207 parts of dodecanedioic acid, 61 parts of acetic anhydride and 2.4 parts of isophorone diisocyanate were reacted as in Example 2. The resulting solid crosslinking agent melted at 68° to 72° C., had a number average molecular weight ($M_n$) of 1,000 (as determined by GPC using polystyrene as the standard) and contained 10.4% of carboxyl groups, 20,0% of anhydride groups and 1.8% of nitrogen.

EXAMPLE 7

207 parts of dodecanedioic acid, 61 parts of acetic anhydride and 56.8 parts of a commercial isocyanurate-modified HDI trimer having an NCO content of 21.5% (Desmodur N 3300, available from Bayer) were reacted as in Example 2. The resulting crosslinking agent melted at 90° to 98° C., had a number average molecular weight ($M_n$) of 2,500 (as determined by GPC using polystyrene as the standard) and contained 9.4% of carboxyl groups, 18.3% of anhydride groups and 3.5% of nitrogen.

EXAMPLE 8

169 parts of azelaic acid, 61 parts of acetic anhydride and 12.3 parts of hexamethylene diisocyanate were reacted as in Example 2. The resulting crosslinking agent melted at 50° to 55° C. and contained 17.5% of carboxyl groups, 24.3% of anhydride groups and 1.3% of nitrogen.

EXAMPLE 9

829 parts of dodecanedioic acid, 245 parts of acetic anhydride and 49.1 parts of hexamethylene diisocyanate were reacted as in Example 2. The resulting crosslinking agent melted at 88° to 102° C. and contained 10.1% of carboxyl groups, 23.0% of anhydride groups and 1.0% of nitrogen.

EXAMPLE 10

142 parts of sebacic acid, 61 parts of acetic anhydride and 16.2 parts of isophorone diisocyanate were reacted as in Example 2. The resulting crosslinking agent melted at 63° to 73° C. and contained 7.9% of carboxyl groups, 28.7% of anhydride groups and 1.4% of nitrogen.

EXAMPLE 11

142 parts of sebacic acid, 61 parts of acetic anhydride and 12.3 parts of hexamethylene diisocyanate were reacted as in Example 2. The resulting crosslinking melted at 80° to 130° C. and contained 8.1% of carboxyl groups, 26.0% of anhydride groups and 1.5% of nitrogen.

EXAMPLE 12

725 parts of dodecanedioic acid, 275 parts of acetic anhydride and 55.4 parts of hexamethylene diisocyanate were reacted as in Example 2. The resulting solid crosslinking agent melted at 75° to 83° C. and contained 1.5% of carboxyl groups, 27.4% of anhydride groups and 1.3% of nitrogen.

EXAMPLE 13

161 parts of dodecanedioic acid, 61 parts of acetic anhydride and 16.2 parts of IPDI were reacted as in Example 2. The resulting solid crosslinking agent melted at 80°–82° C. and contained 4.0% of carboxyl groups, 24.0% of anhydride groups and 1.2% of nitrogen.

EXAMPLE 14

161 parts of dodecanedioic acid, 61 parts of acetic anhydride, 4.3 parts of hexamethylene diisocyanate and 3.7 parts of cyclohexylamine were reacted as in Example 2, the isocyanate and amine being simultaneously added dropwise from separate dropping funnels. The resulting solid powder coating crosslinking agent melted at 78° to 84° C., had a number average molecular weight ($M_n$) of 1,000 (as determined by GPC using polystyrene as the standard) and contained 6.4% of carboxyl groups, 25.1% of anhydride groups and 0.8% of nitrogen.

EXAMPLE 15

142 parts of sebacic acid, 61 parts of acetic anhydride, 4.3 parts of hexamethylene diisocyanate and 3.7 parts of cyclohexylamine were reacted as in Example 14. The resulting solid crosslinking agent melted at 89° to −104° C. and contained 12.0% of carboxyl groups, 27.0% of anhydride groups and 0.9% of nitrogen.

EXAMPLE 16

967 parts of dodecanedioic acid, 259 parts of acetic anhydride and 26 parts of hexamethylene diisocyanate were reacted as in Example 2. 30 parts of trimethylol propane were then added to the melt and allowed to react for 1 hour at 35° C. The resulting powder coating crosslinking agent melted at 110° to 112° C., had a number average molecular weight ($M_n$) of 1,000 (as determined by GPC using polystyrene as the standard) and contained 18.4% of carboxyl groups, 14.4% of anhydride groups and 0.5% of nitrogen.

EXAMPLE 17

1,000 parts of dodecanedioic acid, 200 parts of the HDI trimer described in Example 7 and 900 parts of acetic anhydride were heated under nitrogen to 125° C. and stirred at that temperature for 4 hours. The acetic acid formed was then distilled off in a gentle stream of nitrogen at 20 mbar. The product, which did not show any NCO band in the IR spectrum, melted at 78° to 80° C., had a number average molecular weight ($M_n$) of 1,610 (as determined by GPC using polystyrene as the standard) and contained 2.5% of carboxyl groups, 28.5% of anhydride groups and 3.0% of nitrogen.

EXAMPLE 18

1,000 parts of dodecanedioic acid, 200 parts of HDI trimer described in Example 7 and 240 parts of acetic anhydride were reacted as in Example 17. The resulting crosslinking agent melted at 84° to 104° C., had a number average molecular weight ($M_n$) of 1,270 (as determined by GPC using polystyrene as the standard) and contained 16% of carboxyl groups, 15% of anhydride groups and 1.3% of nitrogen.

EXAMPLE 19

1,900 parts of dodecanedioic acid and 490 parts of acetic anhydride were kept under reflux at 125° C. The acetic acid formed was then distilled off in a water jet vacuum. 100 parts of the HDI trimer described in Example 7 were added and the mixture was stirred for 1 hour at 125° C. A vacuum (0.3 mbar) was then applied for 0.5 hour. The product melted at 101° to 107° C. and contained 15.1% carboxyl groups, 18.3% of anhydride groups and 0.8% of nitrogen.

EXAMPLE 20

1,035 parts of dodecanedioic acid and 306 parts of acetic anhydride were stirred under nitrogen for 2 h at 125° C. The acetic acid formed was then distilled off in a vacuum of 0.3 mbar. 414 g of a uretdione-modified diisocyanate based on IPDI and having an NCO content of 21% and a uretdione content of 5.5% were added to 950 g of the carboxylic anhydride. When the elimination of $CO_2$ was almost complete, 20 g of propylene glycol were added to the mixture. The mixture was then stirred for another hour at 120° to 130° C., after which the product was freed from residual acetic acid at 0.3 mbar. The product had melted at 90° to 108° C. and contained 1.1% of carboxyl groups, 17.3% of anhydride groups and 4.0% of nitrogen.

APPLICATION EXAMPLES

For the paint test, the components (see Table 1) were thoroughly mixed and then homogenized in a Buss PLK 46 kneader (Buss AG, Basel). The housing temperature was 40°

C. in the feed zone and 50° C. in the processing zone. The kneader shaft rotated at 150 r.p.m. To obtain optimal mixing, the melts were extruded twice. The solidified melts were ground to powder coatings with a particle size of <90 μm in a Hosokawa-Mikropul ACM 2 classifier mill (Hosokawa-Mikropul, Cologne). The powder coatings were sprayed onto degreased steel plates using an ESB electrostatic gun. A high voltage of 70 kV(−) was applied. The paints were cured in 30' in a Byk gradient oven at 130°/140°/150°/160° C. The applicational data are set out in Table 2.

dride of claim 1 wherein said polyisocyanate-modified dicarboxylic (poly)anhydride has a carboxyl group content of 0.5 to 30% by weight, an anhydride group content (expressed as $C_2O_3$) of 5 to 35% by weight and a nitrogen content of 0.2 to 8% by weight.

3. The polyisocyanate-modified dicarboxylic (poly)anhydride of claim 1 which is the reaction product prepared with elimination of carbon dioxide at an NCO:COOH equivalent ratio of 0.01:1 to 0.6:1 of

TABLE 1

(Composition of the powder coatings, parts)

| | Application Example No. | | | | | | | |
|---|---|---|---|---|---|---|---|---|
| | 1 | 2 | 3 | 4 | 5 | 6 | 7 (Comp.) | 8 (Comp.) |
| Epoxy Copolymer[1] | 79.7 | 79.1 | 76.6 | 76.1 | 81.8 | 81.0 | 80.2 | 80.4 |
| 1,12-dodecanedioic acid | — | — | — | — | — | — | 17.8 | — |
| Curing agent of Comparison Example 1 | — | — | — | — | — | — | — | 18.6 |
| Curing agent of Example 4 | 19.3 | 19.2 | — | — | — | — | — | — |
| Curing agent of Example 5 | — | — | 22.4 | 22.2 | — | — | — | — |
| Curing agent of Example 20 | — | — | — | — | 17.2 | 17.0 | — | — |
| Tin (II) octoate | — | 0.7 | — | 0.7 | — | 1.0 | 1.0 | — |
| Flow Control Agent[2] | 1.0 | 1.0 | 1.0 | 1.0 | 1.0 | 1.0 | 1.0 | 1.0 |

[1] Almatex PD 7610, available from Mitsui Toatsu, epoxy equivalent weight − 526
[2] Perenol F30P, a powder-form, silicone-free flow control agent, available from Henkel KGaA

TABLE 2

Test results (curing conditions 30 mins./various temperatures)

| Application Example | 130° C. | | | 140° C. | | | 150° C. | | | 160° C. | | |
|---|---|---|---|---|---|---|---|---|---|---|---|---|
| | GL | ER | AC | GL | ER | AC | GL | ER | AC | GL | ER | AC |
| 1 | | | | | | | 90/107 | >9 | 2 | 89/105 | >9 | 2 |
| 2 | 90/107 | 8.2 | 0 | 88/107 | 8.1 | 0 | 86/106 | 7.5 | 0 | 85/106 | >9 | 0 |
| 4 | | | | | | | 88/107 | >9 | 2 | 80/105 | 9.0 | 0–1 |
| 4 | 93/108 | 8.5 | 0–1 | 87/108 | 8.5 | 0–1 | 87/108 | 8.0 | 0 | 86/107 | 8.1 | 0 |
| 5 | | | | 87/107 | >9 | 2 | 90/107 | >9 | 2 | 86/108 | >9 | 0–1 |
| 6 | 86/107 | 8.9 | 0 | 85/106 | 8.8 | 0 | 81/104 | 8.3 | 0 | 83/106 | 8.1 | 0 |
| 7 (Comp.) | 64/104 | 8.5 | 0–1 f | 62/105 | 9.0 | 0–1 sf | 64/105 | 8.8 | 0–1 | 63/104 | 8.8 | 0–1 |
| 8 (Comp.) | 84/105 | 3.5 | 2 cf | 82/103 | 0.6 | 2 f | 84/103 | 8.8 | 2 | 86/105 | 8.8 | 1 |

GL: Gloss values 20° C./60° C.
ER: Erichsen indentation (mm)
AC: Acetone rubbing test; the coating was double-rubbed 50 times with a soaked cotton wool pad. After a regeneration time of 5 minutes, the wiped area was evaluated: 0 = O.K., 1 = surface softened, 2 = film swollen to the substrate, sf = slightly flat, f = flat, cf = completely flat Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate-modified dicarboxylic (poly)anhydride which is solid below 40° C., liquid above 120° C. and based on the reaction product of an organic polyisocyanate with more than equivalent quantities, based on the NCO/COOH reaction, of a dicarboxylic (poly)anhydride containing free carboxyl groups and optional subsequent modification of the reaction product with less than equivalent quantities, based on the anhydride groups, of anhydride-reactive amino and/or hydroxyl groups.

2. The polyisocyanate-modified dicarboxylic (poly)anhydride of claim 1 wherein said polyisocyanate-modified A) an anhydride component containing one or more dicarboxylic (poly)anhydrides corresponding to formula (II):

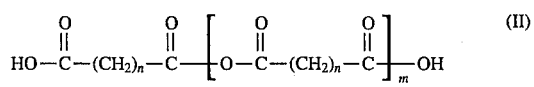

optionally present in admixture with up to 50% by weight, based on the total weight of component A), of dicarboxylic acids corresponding to formula (I):

with

B) a polyisocyanate component containing one or more organic polyisocyanates and optionally
- C) less than equivalent quantities, based on the anhydride groups, of compounds containing anhydride-reactive amino and/or hydroxyl groups, wherein
- m is an integer of 1 to 100 and
- n is an integer of 4 to 16.

4. The polyisocyanate-modified dicarboxylic (poly)anhydride of claim 2 wherein said polyisocyanate-modified dicarboxylic (poly)anhydride has a carboxyl group content of 0.5 to 30% by weight, an anhydride group content (expressed as $C_2O_3$) of 5 to 35% by weight and a nitrogen content in the form of amide and/or urea groups of 0.2 to 8% by weight.

* * * * *